United States Patent [19]
Arai

[11] Patent Number: 5,887,026
[45] Date of Patent: Mar. 23, 1999

[54] TRANSMISSION LEVEL SETTING CIRCUIT AND MODEM UNIT USING THE SAME

[75] Inventor: Yasuhiro Arai, Kawasaki, Japan

[73] Assignee: Fujitsu Limited, Kawasaki, Japan

[21] Appl. No.: 524,806

[22] Filed: Sep. 7, 1995

[30] Foreign Application Priority Data

Feb. 17, 1995 [JP] Japan ................................. 7-029820

[51] Int. Cl.⁶ .................................................. H04B 1/38
[52] U.S. Cl. .......................................... 375/222; 455/557
[58] Field of Search .................................... 375/222, 257;
455/69, 67, 7, 53, 54, 68, 115, 116, 126,
127, 8, 552, 557; 379/402, 410, 411, 400,
401, 403, 404, 406, 59, 60, 58

[56] References Cited

U.S. PATENT DOCUMENTS

| | | | |
|---|---|---|---|
| 4,811,421 | 3/1989 | Havel et al. | 455/69 |
| 4,989,243 | 1/1991 | Choi | 379/402 |

FOREIGN PATENT DOCUMENTS

| | | |
|---|---|---|
| 3-099571 | 4/1991 | Japan . |
| 4-290366 | 10/1992 | Japan . |
| 5-244092 | 9/1993 | Japan . |
| 5-327791 | 12/1993 | Japan . |

*Primary Examiner*—Don N. Vo
*Attorney, Agent, or Firm*—Staas & Halsey

[57] ABSTRACT

A transmission level setting circuit outputs a signal having a transmission level with respect to a portable telephone based on a signal transmitted from a modem unit. The transmission level setting circuit includes a part which receives the signal from the modem unit, and a circuit which automatically outputs a signal having a fixed level regardless of the signal transmission level of the modem unit.

22 Claims, 5 Drawing Sheets

FIG. I

TRANSMISSION LEVEL SETTING CIRCUIT AND MODEM UNIT USING THE SAME

BACKGROUND OF THE INVENTION

The present invention generally relates to transmission level setting circuits and modem units, and more particularly to a transmission level setting circuit which sets a carrier transmission level when making a data communication on a switched line or a radio line of a portable telephone, and to a modem unit using such a transmission level setting circuit.

Recently, it has become possible to make a data communication using a switched line or a radio line of a portable telephone by connecting a modem unit to the portable telephone or the switched line and controlling the modem unit from a personal computer or the like. In this case, because of the structural differences between the switched line and the radio line, the methods of setting the carrier transmission level from the modem unit are different between the case where the switched line is used and the case where the radio line is used. For this reason, in the general modem unit, the setting of the carrier transmission level is changed depending on the line used.

When making the data communication via the switched line, signal attenuation occurs depending on the distance from the modem unit to an exchange. Hence, in order to set the carrier transmission level of the modem unit to an optimum value, it is necessary to take into consideration the attenuation value and to increase and set the carrier transmission level depending on the attenuation value.

In a conventional modem unit that is used to make the data communication via the switched line, a standard setting of the carrier transmission level when the modem unit is shipped from a factory is −15 dBm, for example. For this reason, when this modem unit is connected to the personal computer or the like, it is necessary to increase the carrier transmission level at a transmitter part within the modem unit depending on the signal attenuation value that is dependent on the distance from the modem unit to the exchange. Such a change in the carrier transmission level is made manually from the personal computer or the like to which the modem unit is connected, by a qualified person such as the engineer in charge of the work.

On the other hand, when making the data communication via the radio line of the portable telephone, there is no need to take into consideration the signal attenuation value because the modem unit and the portable telephone are connected within a short distance. Hence, the carrier transmission level of the modem unit can be set to the optimum value by setting the carrier transmission level to a maximum value within a range of the input level specified by the portable telephone.

A conventional modem unit that is used to make the data communication via the radio line of the portable telephone is connected to the portable telephone via an attenuator which reduces the standard carrier transmission level that is set at the time of the shipping from the factory to −51 dBm, for example, and a resistor having a transmission impedance of 600 Ω. Accordingly, when making the data communication via the radio line of the portable telephone, it is necessary to change the carrier transmission level manually from the personal computer or the like to which the modem unit is connected, by a qualified person such as the engineer in charge of the work.

According to the conventional modem units, it was necessary to manually change the carrier transmission level depending on the kind of line that is used for the data communication, and there was a problem in that it required a troublesome operation of manually changing the carrier transmission level. In addition, a person who may perform such a troublesome operation was limited to a qualified person such as the engineer in change of the work, thereby leading to another problem in that the general users were prevented from freely making the data communication using the portable telephone.

On the other hand, it is conceivable to connect between the modem unit that is connected to the switched line and the portable telephone an adapter having a circuit which attenuates a signal in a signal path from the modem unit to the portable telephone by a fixed attenuation value of 36 dB, for example. Even in this case, however, problems similar to those of the conventional modem unit described above occur because the carrier transmission level from the adapter to the portable telephone will change if the carrier transmission level from the modem unit changes.

SUMMARY OF THE INVENTION

Accordingly, it is a general object of the present invention to provide a novel an useful transmission level setting circuit and modem unit, in which the problems described above are eliminated.

Another and more specific object of the present invention is to provide a transmission level setting circuit which can set a carrier transmission level to an optimum level depending on the kind of line that is used for a data communication without having the user to be aware of the kind of line used and without the need to manually change the carrier transmission level, and to a modem unit which uses such a transmission level setting circuit.

Still another object of the present invention is to provide a transmission level setting circuit which outputs a signal having a transmission level with respect to a portable telephone based on a signal transmitted from a modem unit, comprising means for receiving the signal from the modem unit, and a circuit, coupled to the means, automatically outputting a signal having a fixed level regardless of the signal transmission level of the modem unit. According to the transmission level setting circuit of the present invention, it is possible to automatically set the signal transmission level to an optimum level depending on the kind of line that is used for the data communication, without having the user to be aware of the kind of line and without the need to manually change the signal transmission level. In addition, when making the data communication using the radio line of the portable telephone, the signal having the optimum fixed level for the radio line is constantly output regardless of the signal transmission level of the modem unit.

A further object of the present invention is to provide a transmission level setting circuit comprising a first circuit which outputs a signal having a transmission level with respect to a switched line based on a signal transmitted from a modem unit, a second circuit which outputs a signal having a transmission level with respect to a portable telephone based on the signal transmitted from the modem unit, and means for controlling the signal level transmitted from the modem unit depending on whether a data communication is to be made via the switched line or a radio line of the portable telephone, where the means automatically controls the modem unit so that the second circuit outputs a signal having a fixed transmission level when making the data communication via the radio line of the portable telephone. According to the transmission level setting circuit of the present invention, it is possible to automatically set the signal transmission level to an optimum level depending on the kind of line that is used for the data communication, without having the user to be aware of the kind of line and without the need to manually change the signal transmission level. In addition, when making the data communication using the radio line of the portable telephone, the signal having the optimum fixed level for the radio line is constantly output regardless of the signal transmission level of the modem unit.

Another object of the present invention is to provide a modem unit comprising a transmitter part which transmits a signal, and a circuit which automatically outputs a signal having a fixed level with respect to a portable telephone regardless of a signal transmission level of the transmitter part, so that the modem unit outputs a signal having a transmission level with respect to a switched line and the portable telephone. According to the modem unit of the present invention, it is possible to automatically set the signal transmission level to an optimum level depending on the kind of line that is used for the data communication, without having the user to be aware of the kind of line and without the need to manually change the signal transmission level. In addition, when making the data communication using the radio line of the portable telephone, the signal having the optimum fixed level for the radio line is constantly output regardless of the signal transmission level of the modem unit.

Still another object of the present invention is to provide a modem unit comprising a modem circuit part including a transmitter part which transmits a signal, a first circuit which outputs a signal having a transmission level with respect to a switched line based on the signal transmitted from the transmitter part, a second circuit which outputs a signal having a transmission level with respect to a portable telephone based on the signal transmitted from the transmitter part, and means for controlling the signal level transmitted from the transmitter part depending on whether a data communication is to be made via the switched line or a radio line of the portable telephone, where the means automatically controls the modem circuit part so that the second circuit outputs a signal having a fixed transmission level when making the data communication via the radio line of the portable telephone. According to the modem unit of the present invention, it is possible to automatically set the signal transmission level to an optimum level depending on the kind of line that is used for the data communication, without having the user to be aware of the kind of line and without the need to manually change the signal transmission level. In addition, when making the data communication using the radio line of the portable telephone, the signal having the optimum fixed level for the radio line is constantly output regardless of the signal transmission level of the modem unit.

Other objects and further features of the present invention will be apparent from the following detailed description when read in conjunction with the accompanying drawings.

DESCRIPTION OF THE PREFERRED EMBODIMENTS

First, a description will be given of a first embodiment of a transmission level setting circuit according to the present invention, by referring to FIG. 1. This first embodiment of the transmission level setting circuit is applied to a first embodiment of a modem unit according to the present invention.

In this first embodiment, a carrier transmission level from the modem unit is fixed to −51 dBm when making a data communication via a radio line of a portable telephone. On the other hand, the carrier transmission level from the modem unit is set to −7 dBm to −15 dBm when making the data communication via a switched line.

Figure 1:
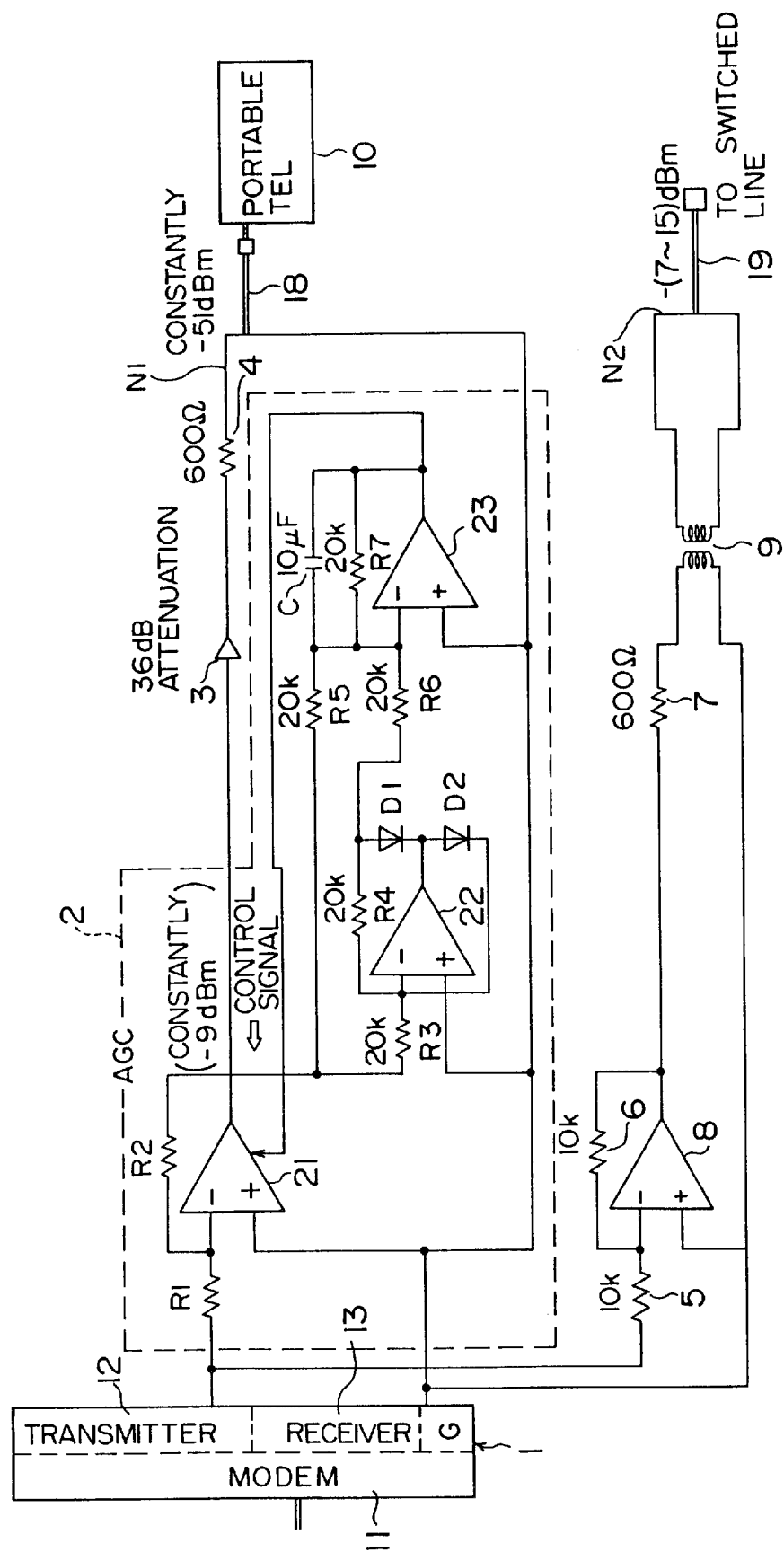
FIG. 1 is a circuit diagram showing a first embodiment of a transmission level setting circuit according to the present invention.

In FIG. 1, the modem unit generally includes a modem circuit part 1, an automatic gain control (AGC) circuit 2, operational amplifiers 3 and 8, resistors 4 through 7, and a line transformer 9 which are connected as shown.

The modem circuit part 1 generally includes a modem 11, a transmitter part 12, and a receiver part 13. In FIG. 1, G indicated within the modem part 1 denotes ground. The modem circuit part 1 itself may be formed by a modem large scale integrated circuit (LSI) which is generally available on the market.

In FIG. 1 and FIGS. 2, 3 and 5 which will be described later, the connections to the receiver part 13 within the modem circuit part 1 are not directly related to the subject matter of the present invention, and illustration and description thereof will be omitted for this reason.

The AGC circuit 2 includes operational amplifiers 21 through 23, resistors R1 through R7, diodes D1 and D2, and a capacitor C which are connected as shown in FIG. 1. For example, the resistors R3 through R5 and R7 have resistances of 20 kΩ, and the resistor R6 has a resistance of 10 kΩ. In addition, the capacitor C has a capacitance of 10 $\mu$F, for example.

For example, the resistors 4 and 7 have resistances of 600 Ω, and the resistors 5 and 6 have resistances of 10 kΩ. A node N1 is connected to a portable telephone 10 via a connection cable 18, and a node N2 is connected to a switched line (not shown) via a connection cable 19.

The modem circuit part 1 is constructed to transmit a carrier having a level of 0 to −15 dBm depending on the setting of the transmission level for the switched line. The operational amplifier 21 and the resistors R1 and R2 form a voltage controlled amplifier circuit, and this voltage controlled amplifier circuit normally functions as a 0 dB amplifier. For this reason, the voltage controlled amplifier circuit transmits a carrier having a level of 0 to −15 dBm depending on the level setting of the modem circuit part 1. The carrier output from the voltage controlled amplifier circuit is subjected to a full-wave rectification by the operational amplifiers 22 and 23, and is smoothened by the capacitor C which is connected to the operational amplifier 23. Hence, an output of the operational amplifier 23 corresponds to an A.C. voltage average value of the output waveform of the voltage controlled amplifier circuit.

The A.C. voltage average value output from the operational amplifier 23 is supplied to a control signal input terminal of the voltage controlled amplifier circuit to form a feedback loop. Accordingly, the attenuation value of the voltage controlled amplifier circuit becomes large when the A.C. voltage average value is large. On the other hand, the A.C. voltage average value becomes small when the output of the voltage controlled amplifier circuit becomes small, and the feedback loop assumes a balanced state when the output level of the voltage controlled amplifier circuit becomes a constant value.

The output level of the voltage controlled amplifier circuit in the balanced state of the feedback loop can be set constantly to −9 dBm by appropriately selecting the resistances of the resistors R1 and R2. Thus, the output of the voltage controlled amplifier circuit having the level of −9 dBm is attenuated to 36 dB by the operational amplifier 3, and the carrier transmission level via the resistor 4 and the node N1 is constantly set to −51 dBm. In other words, regardless of the setting of the transmission level of the modem circuit part 1 for the switched line, the carrier transmission level from the node N1 is constantly and automatically set to a fixed value of −51 dBm in this embodiment.

On the other hand, the carrier transmitted from the transmitter part 12 of the modem circuit part 1 and having the level of 0 to −15 dBm is output from the node N2 with respect to the switched line via an amplifier circuit which is made up of the operational amplifier 8 and the resistors 5 and 6, the resistor 7 and the line transformer 9. For this reason, the carrier transmission level from the node N2 is set to −7 dBm to −15 dBm depending on the transmission level of the modem circuit part 1 for the switched line. The transmission level of the modem circuit part 1 for the switched line is set manually from a host unit (not shown) such as a personal computer via a modem unit controller (not shown) which is connected to the modem circuit part 1 by a qualified person such as the engineer in charge of the work, similarly as in the conventional case.

As a result, according to this embodiment, there is no need to manually change the carrier transmission level depending on the kind of line that is used for the data transmission, and it is unnecessary to carry out the troublesome operation of manually changing the carrier transmission level.

Figure 2:
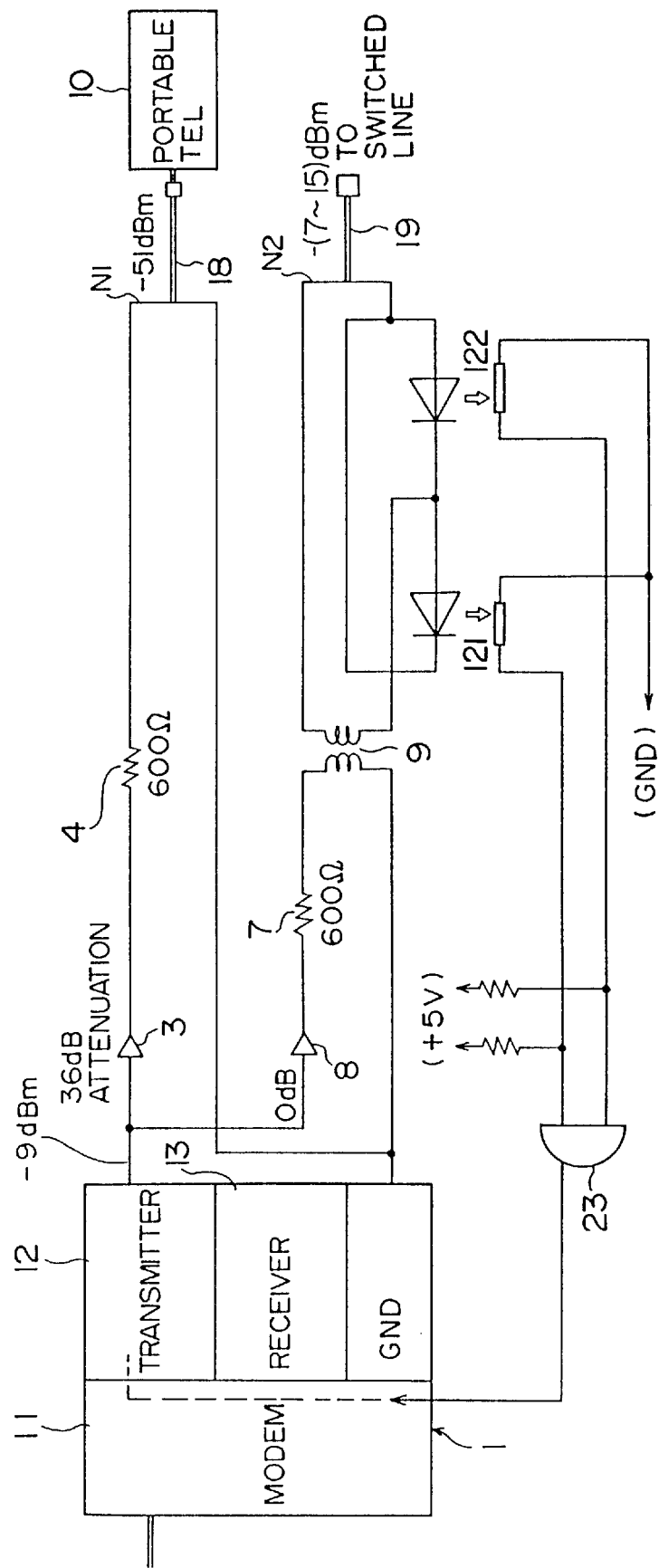
FIG. 2 is a circuit diagram showing a second embodiment of the transmission level setting circuit according to the present invention.

Next, a description will be given of a second embodiment of the transmission level setting circuit according to the present invention, by referring to FIG. 2. This second embodiment of the transmission level setting circuit is applied to a second embodiment of the modem unit according to the present invention. In FIG. 2, those parts which are the same as those corresponding parts in FIG. 1 are designated by the same reference numerals, and a description thereof will be omitted.

In this embodiment, the carrier transmission level from the modem unit is fixed to −51 dBm when making the data communication via the radio line of the portable telephone. On the other hand, when making the data communication via the switched line, the carrier transmission level from the modem unit is set to −7 dBm to −15 dBm.

A modem unit shown in FIG. 2 generally includes the modem circuit part 1, the operational amplifiers 3 and 8, the resistors 4 and 7, the line transformer 9, photocouplers 121 and 122, and an AND circuit 23 which are connected as shown. The photocouplers 121 and 122 are provided in a signal path to the switched line, so as to detect whether or not a D.C. current flows through this signal path. When no D.C. current flows through this signal path, the modem 11 of the modem circuit part 1 automatically sets the carrier transmission level of the transmitter part 12 to a fixed value of −9 dBm based on a set signal from the AND circuit 23. Hence, the output of the transmitter part 12 having the level of −9 dBm is attenuated to 36 dB in the operational amplifier 3, and the carrier transmission level via the resistor 4 and the node N1 is constantly set to −51 dBm. In other words, regardless of the setting of the transmission level of the modem circuit part 1 for the switched line, the carrier transmission level from the node N1 is constantly and automatically set to the fixed value of −51 dBm in this embodiment when no data communication is made via the switched line. That is, when making the data communication via the radio line of the portable telephone, the carrier transmission level from the node N1 is constantly and automatically set to the fixed value of −51 dBm.

On the other hand, the carrier which is transmitted from the transmitter part 12 of the modem circuit part 1 and has the level of 0 to −15 dBm is output from the node N2 with respect to the switched line via the operational amplifier 8, the resistor 7 and the line transformer 9. For this reason, the carrier transmission level from the node N2 is set to −7 dBm to −15 dBm depending on the setting of the transmission level of the modem circuit part 1 for the switched line. The transmission level of the modem circuit part 1 for the switched line is set manually from a host unit (not shown) such as a personal computer via a modem unit controller (not shown) which is connected to the modem circuit part 1 by a qualified person such as the engineer in charge of the work, similarly as in the conventional case. In addition, when making the data communication via the switched line, a D.C. current flows through the signal path to the switched line, and no set signal is supplied from the AND circuit 23 to the modem 11 of the modem circuit part 1. Accordingly, the operation of automatically setting the carrier transmission level from the transmitter part 12 to the fixed level of −9 dBm is not carried out in this case.

As a result, according to this embodiment, there is no need to manually change the carrier transmission level depending on the kind of line that is used for the data transmission, and it is unnecessary to carry out the troublesome operation of manually changing the carrier transmission level.

Figure 3:
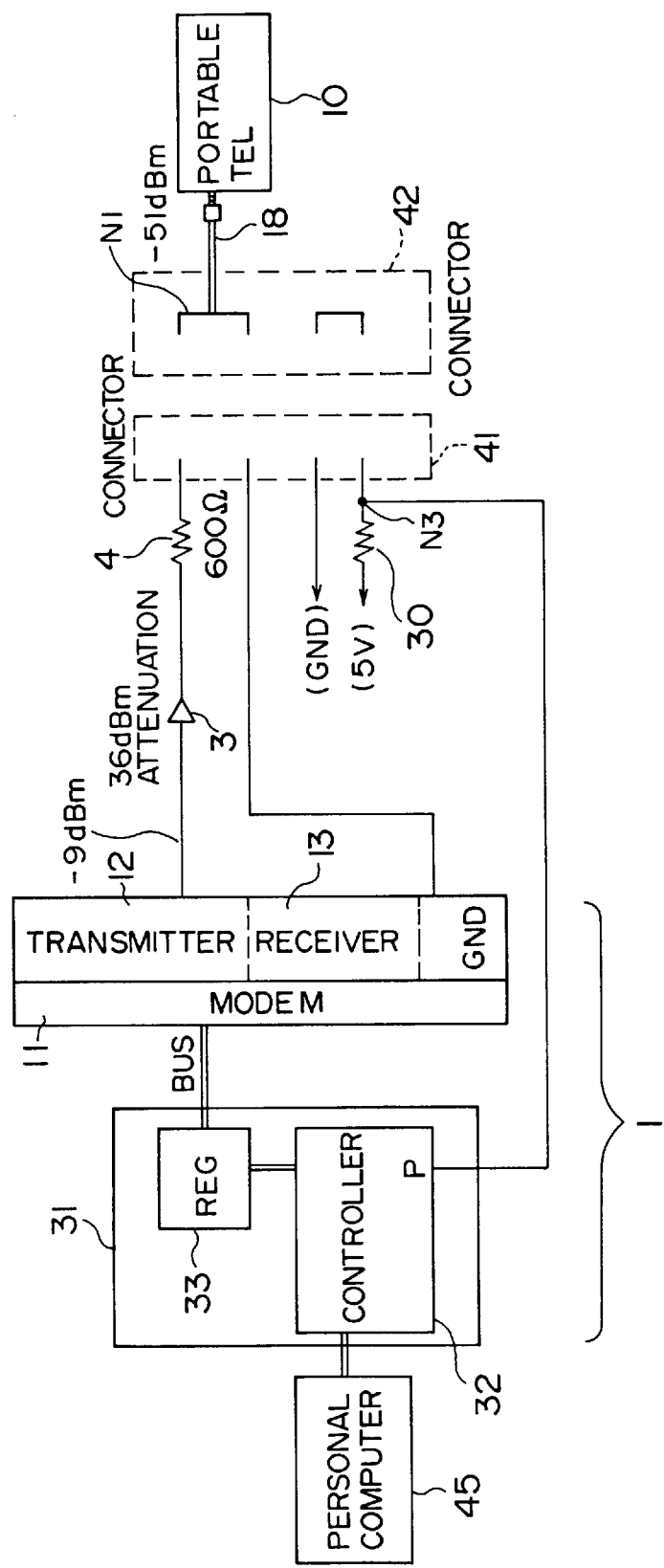
FIG. 3 is a circuit diagram showing a third embodiment of the transmission level setting circuit according to the present invention.

Next, a description will be given of a third embodiment of the transmission level setting circuit according to the present invention, by referring to FIG. 3. This third embodiment of the transmission level setting circuit is applied to a third embodiment of the modem unit according to the present invention. In FIG. 3, those parts which are the same as those corresponding parts in FIG. 1 are designated by the same reference numerals, and a description thereof will be omitted. Further, the circuit provided with respect to the switched line is identical to that shown in FIG. 1, and thus, the illustration thereof is omitted in FIG. 3.

In this embodiment, the carrier transmission level from the modem unit is fixed to −51 dBm when making the data communication via the radio line of the portable telephone.

A modem unit shown in FIG. 3 generally includes the modem circuit part 1, the operational amplifier 3, resistors 4 and 30, a microprocessor unit (MPU) 31, and a connector 41 which are connected as shown. When making the data communication via the radio line of the portable telephone, the connector 41 is connected to a connector 42. When the connectors 41 and 42 are connected, the transmitted carrier from the transmitter part 12 of the modem circuit part 1 is passed through the operational amplifier 3 and the resistor 4 and is output from the node N1 of the connector 42 with respect to the portable telephone 10 via the connection cable 18. On the other hand, the resistor 30 is connected between a power supply which supplies +5 V and the ground GND, and a selection signal from a node N3 is supplied to a general port P of the MPU 31.

In this embodiment, the connector 41 is provided on the side of the modem unit, and the connector 42 is provided on the side of the connection cable 18 which connects to the portable telephone 10. However, for example, it is of course possible to provide the connector 41 on the tip end of a connection cable which connects to the modem unit, and to omit the connection cable 18 and provide the connector 42 directly on the side of the portable telephone 10.

The MPU 31 includes a controller 32 and a register 33. The controller 32 is connected to a personal computer 45. The controller 32 receives a set value of the carrier transmission level of the transmitter part 12 within the modem circuit part 1 and the like, and stores the set value in an internal register of the controller 32. In addition, a predetermined fixed value for the carrier transmission level of the transmitter part 12 is set in advance into the controller 32 from the personal computer 45, for example, and this predetermined fixed value is stored in the internal register of the controller 32. The controller 32 stores the set value into the register 33 when making the data communication via the switched line and sets the predetermined fixed value into the register 33 when making the data communication via the radio line of the portable telephone, depending on the selection signal which is supplied to the general port P of the MPU 31 via the connector 41. The value stored in the register 33 is read under control of the controller 32 and is supplied to the transmitter part 12 within the modem circuit part 1, so that the carrier transmission level of the transmitter part 12 is set based on the value supplied from the register 33.

When making the data communication via the switched line, the connector 41 will not be connected to the connector 42. For this reason, the node N3 will not be grounded, and the controller 32 stores the set value from the personal computer 45 into the register 33 depending on a high-level selection signal from the node N3. Hence, in this case, the transmitter part 12 outputs the transmitting carrier having the level based on the set value, and the carrier having the level of −7 dBm to −15 dBm is output with respect to the switched line from the node N2 via a circuit similar to that shown in FIG. 1.

On the other hand, when making the data communication via the radio line of the portable telephone, the connector 41 is connected to the connector 42. For this reason, the node N3 is grounded, and the controller 32 stores the predetermined fixed value into the register 33 based on the terminal voltage of the resistor 30 from the node N3, that is, a low-level selection signal. Accordingly, in this case, the transmitter part 12 automatically and fixedly outputs the transmitting carrier having the level of −9 dBm which is based on the predetermined fixed value, and the carrier having the fixed value of −51 dBm is output with respect to the portable telephone 10 from the node N1 of the connector 42.

As a result, according to this embodiment, there is no need to manually change the carrier transmission level depending on the kind of line that is used for the data transmission, and it is unnecessary to carry out the troublesome operation of manually changing the carrier transmission level. Furthermore, the setting of the carrier transmission level is made automatically based on the connection state of the connector 41.

In FIG. 3, the MPU 31 may be a processor which forms a part of the modem 11.

Figure 4:
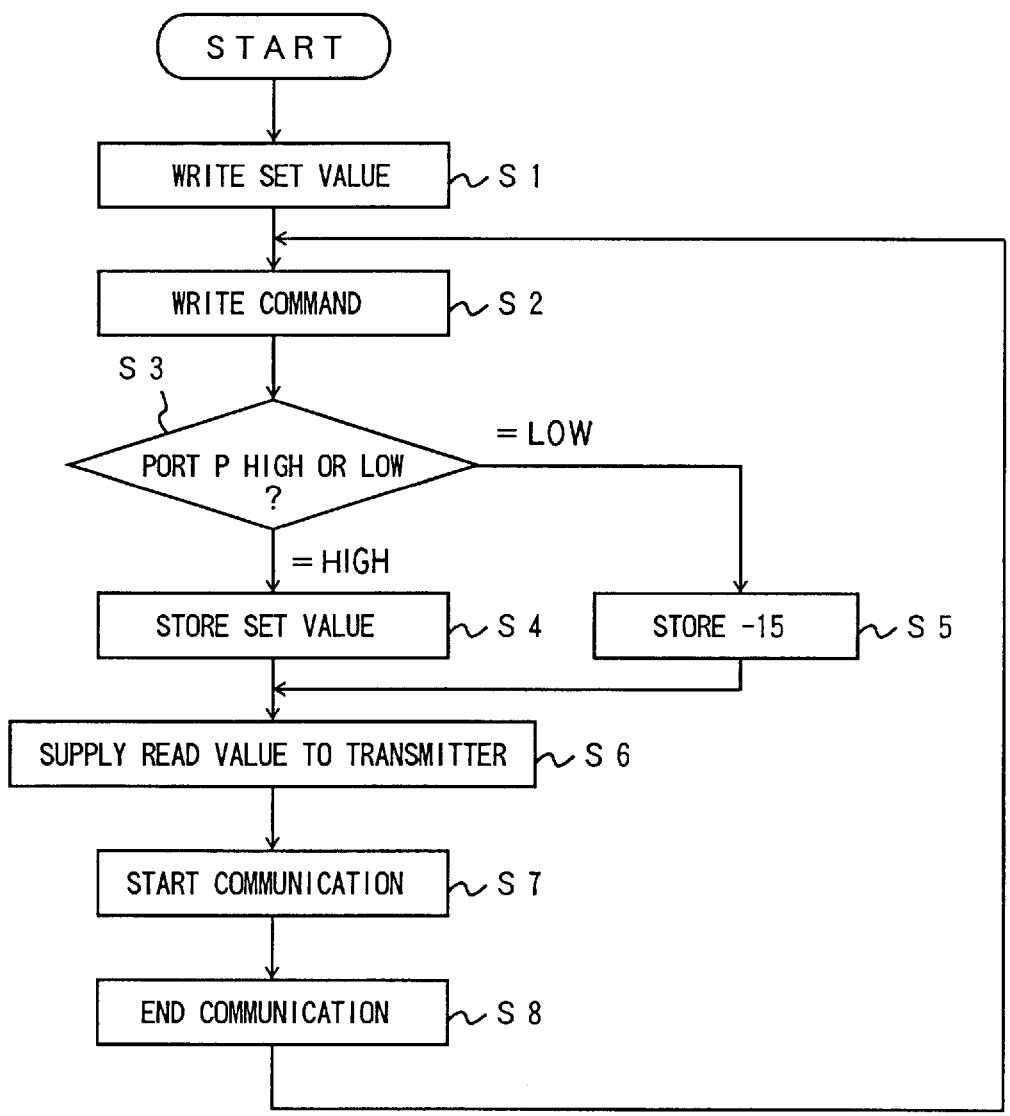
FIG. 4 is a flow chart for explaining the operation of the third embodiment of the transmission level setting circuit.

FIG. 4 is a flow chart for explaining the operation of the controller 32 within the MPU 31 shown in FIG. 3.

In FIG. 4, a step S1 writes the set value of the transmission level from the personal computer 45 into the internal register of the controller 32. A step S2 writes a communication start command from the personal computer 45 into the internal register of the controller 32. A step S3 decides whether the level of the selection signal supplied to the general port P of the MPU 31 has a high level or a low level. When the step S3 detects the high level, a step S4 stores the set value which is read from the internal register of the controller 32 into the register 33. On the other hand, when the step S3 detects the low level, a step S5 stores the predetermined fixed value which is read from the internal register of the controller 32 into the register 33. For example, the predetermined fixed value is −15.

After the step S4 or S5, a step S6 reads the value stored in the register 33 and supplies the read value to the transmitter part 12. A step S7 starts the data communication, and the process returns to the step S2 when the end of the data communication is detected in a step S8, so as to wait for a next communication start command which is obtained from the personal computer 45.

Figure 5:
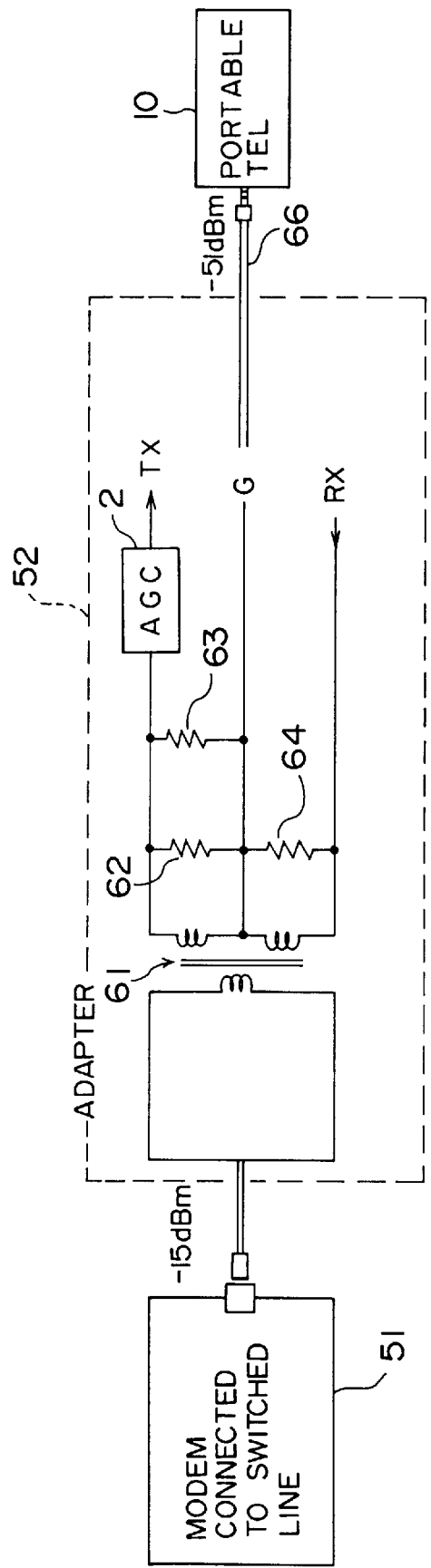
FIG. 5 is a circuit diagram showing a fourth embodiment of the transmission level setting circuit according to the present invention.

Next, a description will be given of a fourth embodiment of the transmission level setting circuit according to the present invention, by referring to FIG. 5. This fourth embodiment of the transmission level setting circuit is applied to a fourth embodiment of the modem unit according to the present invention. In FIG. 5, those parts which are the same as those corresponding parts in FIG. 1 are designated by the same reference numerals, and a description thereof will be omitted.

In this embodiment, the carrier transmission level from the modem unit is fixed to −51 dBm when making the data communication via the radio line of the portable telephone.

In FIG. 5, a modem unit 51 has a known construction which transmits the carrier with respect to the switched line. Hence, the carrier having the level of −7 dBm to −15 dBm, for example, is transmitted from the modem unit 51. The carrier transmitted from the modem unit 51 is output with respect to the portable telephone 10 via an adapter 52 and a three-core cable 66. This adapter 52 has a construction which constantly outputs a carrier having a fixed level of −51 dBm via the three-core cable 66 regardless of the carrier transmission level from the modem unit 51.

The adapter 52 includes a transformer 61, resistors 62 through 64, and the AGC circuit 2 which are connected as shown in FIG. 5. The AGC circuit 2 has the same construction as the AGC circuit 2 shown in FIG. 1. A signal which is transmitted with respect to the portable telephone 10 is output from a terminal TX, a terminal G is grounded, and a signal which is received from the portable telephone 10 is input to a terminal RX. The terminals TX, G and RX are connected to corresponding lines of the three-core cable 66.

According to this embodiment, the output signal level of the voltage controlled amplifier circuit in the balanced state of the feedback loop within the AGC circuit 2 can constantly be set to 31 9 dBm by appropriately selecting the resistances of the resistors R1 and R2 shown in FIG. 1. Hence, the output of the voltage controlled amplifier circuit having the level of −9 dBm is attenuated into 36 dB in the operational amplifier 3, and the carrier transmission level via the resistor 4 and the node N1 is constantly set to −51 dBm. In other words, the carrier transmission level from the three-core cable 66 in this embodiment is constantly and automatically set to the fixed value of −51 dBm regardless of the setting of the transmission level of the modem unit 51 for the switched line.

As a result, it is unnecessary in this embodiment to manually change the carrier transmission level depending on the kind of line that is used for the data communication, and there is no need to carry out the troublesome operation of manually changing the carrier transmission level. That is, it is possible to automatically set the carrier transmission level by connecting the modem unit 51 to the portable telephone 10 via the adapter 52 only when making the data communication via the radio line of the portable telephone.

Of course, it is possible to provide the adapter 52 on the side of the portable telephone 10. In this case, the modem unit 51 is connected to the adapter 52 via a connection cable when making the data communication via the radio line of the portable telephone 10.

Furthermore, it is possible to provide the adapter 52 on the side of the modem unit 51. In other words, in the fourth embodiment of the modem unit, the modem unit 51 integrally comprises the adapter 52. In this case, it is desirable to provide a selector (not shown) which selectively outputs the output of the modem unit 51 and the output via the adapter 52.

In other words, the AGC circuit 2 simply needs to be provided in a signal path which connects the modem unit 51 and the portable telephone 10.

Further, the present invention is not limited to these embodiments, but various variations and modifications may be made without departing from the scope of the present invention.

What is claimed is:

1. A transmission level setting circuit which sets a transmission level of a carrier output by a modem unit to a predetermined value, said transmission level setting circuit comprising:

a first circuit outputting, with respect to a switched line, a carrier having a transmission level dependent on a carrier transmission level output by the modem unit, which generates a carrier having a transmission level adjustable within a predetermined range; and a second circuit setting a transmission level of the carrier output by the modem unit to a fixed transmission level corresponding to a transmission level required for a portable telephone.

2. The transmission level setting circuit as claimed in claim 1, wherein said second circuit comprises an automatic gain control circuit which outputs the carrier having the fixed level regardless of the transmission level of the carrier output by the modem unit.

3. The transmission level setting circuit as claimed in claim 1, wherein said second circuit is provided in a signal path which connects the modem unit and the portable telephone.

4. The transmission level setting circuit as claimed in claim 1, which further comprises:

a connection cable for connecting the modem unit to the portable telephone, said second circuit being provided within said adapter.

5. A modem unit comprising:

a transmitter transmitting a carrier having a transmission level selectable within a predetermined range;

a first circuit outputting, with respect to a switched line, a carrier having a transmission level dependent on a transmission level of the carrier output from said transmitter part; and a second circuit setting the transmission level of the carrier output from said transmitter part to a fixed transmission level corresponding to a transmission level required for a portable telephone.

6. The modem unit as claimed in claim 5, wherein said second circuit comprises an automatic gain control circuit which outputs a carrier having a fixed level regardless of a carrier transmission level of said transmitter part.

7. The modem unit as claimed in claim 5, wherein said second circuit is provided in a signal path which connects the modem unit and the portable telephone.

8. The modem unit as claimed in claim 5, which further comprises:

a connection cable for connecting the modem unit to the portable telephone, said output second circuit being provided within said adapter.

9. A transmission level setting circuit setting a dBm power level of a carrier to a fixed transmission level specified for input to a portable telephone, comprising:

input terminals receiving a carrier having a transmission level, within a specified dBm power level range, from a modem;

output terminals for connection to a portable telephone; and an automatic gain control circuit, interconnecting the input and output terminals, receiving and automatically adjusting the attenuation therein of the received carrier, for any dBm power level thereof within the specified dBm power level range, for supply to the output terminals as an output carrier of the specified dBm power level.

10. A transmission level setting circuit, as recited in claim 9, wherein the automatic gain control circuit comprises:

a voltage controlled amplifier circuit, functioning as a 0 dB amplifier, receiving the carrier from the input terminals and producing a carrier output having a fixed, dBm power level; and an element receiving and attenuating the output of the voltage controlled amplifier circuit by a fixed dB amount to produce the output carrier having a transmission level at the specified dBm power level, at the output terminals.

11. A transmission level setting circuit, as recited in claim 10, wherein the voltage controlled amplifier circuit further comprises:

a first operational amplifier having a control input and producing the output carrier at an output thereof; and a feedback circuit producing an AC voltage average value of the output carrier of the first operational amplifier, as a feedback control signal supplied to the control signal input terminal of the operational amplifier.

12. A transmission level setting circuit as recited in claim 9, wherein the output terminals comprise a first node, for connection to a portable telephone, to which the output carrier of the automatic gain control circuit is supplied and a second node, for connection to a switched line having a selected dB power level range, which is different from the selected dB power level range of the received carrier transmission signal, further comprising:

an alternative signal path connecting the input terminals to the second node, the dBm power signal level of the carrier received at the input terminals from the modem being manually adjusted for supply, through the alternative signal path, to the second node at the selected, different dBm power level range.

13. A carrier generation apparatus, comprising:

a modem producing a carrier for transmission as an internal carrier within the apparatus having a selected one of a selectively set internal power level, in a range of internal power levels, and a fixed internal power level;

a first circuit receiving the internal carrier produced by the modem and producing a first output carrier at a fixed, first output power level, based on the internal carrier but independent of the selectively set internal power level of the internal carrier; and a second circuit receiving the internal carrier produced by the modem and selectively producing a second output carrier at a second, selectively set output power level in a second range of output power levels determined in accordance with the internal power level and the range of internal power levels of the internal carrier.

14. The carrier generation apparatus as claimed in claim 13, wherein the first circuit comprises an automatic gain control circuit.

15. The carrier generation apparatus as claimed in claim 13, wherein the first circuit comprises:

an automatic gain control circuit receiving the internal carrier produced by the modem and outputting a second internal carrier based on the received internal carrier and having a second, fixed internal power level within the range of internal power levels but independent of any selectively set internal power level of the internal carrier produced by the modem; and an attenuator receiving the second internal carrier, output by the automatic gain control circuit, and producing the first output carrier at the fixed, first output power level, based on the received, second internal carrier and the second, fixed internal power level.

16. The carrier generation apparatus as claimed in claim 13, wherein the modem further comprises a control signal input terminal connected to an external host unit for receiving a control signal from the external host unit, the control signal selectively setting the internal power level of the internal carrier produced by the modem.

17. The carrier generation apparatus having a first output terminal for connection to a portable telephone and a second output terminal for connection to a switched line and comprising:

a modem producing a carrier for transmission as an internal carrier within the apparatus and, in response to the presence of data communications on the switched line, selectively setting an internal power level of the internal carrier in a range of internal power levels and, in response to the absence of data communications over the switched line, setting the internal carrier to a fixed internal power level, in the range of internal power levels but independently of any internal power level of the internal carrier selectively set by the modem for data communications on the switched line;

a first circuit receiving the internal carrier having the fixed internal power level produced by the modem and producing, at the first output terminal for supply to a portable telephone, a first output carrier at a fixed, first output power level corresponding to the fixed internal power level; and a second circuit receiving the internal carrier produced by the modem and producing, at the second output terminal for supply to the switched line, a second output carrier at a second, selectively set output power level in a range of output power levels, determined respectively in accordance with the selectively set internal power level and the range of internal power levels of the internal carrier.

18. A carrier generation apparatus, as claimed in claim 17, further comprising a current sensor, responsive to the absence of current flow in the second circuit corresponding to the absence of a second output carrier being produced by the second circuit, for supplying a control signal to the modem for producing the internal carrier at the fixed internal power level.

19. A carrier generation apparatus as claimed in claim 17, further comprising:

a connector connecting a portable telephone to the first output terminal; and a detector detecting the connection of the portable telephone to the first output terminal for selectively switching the modem to produce the internal carrier at the fixed internal power level.

20. A transmission level setting circuit setting a dBm power level of a carrier to a specified transmission level, comprising:

input terminals receiving a carrier having a transmission level, within a specified dBm power level range, from a modem;

first output terminals for connection to a switched line;

second output terminals for connection to a portable telephone;

an attenuation circuit interconnecting the input terminals and the first output terminals and outputting, with respect to the switched line, a carrier having a transmission level dependent on the transmission level of the carrier received by the input terminals; and an automatic gain control circuit, interconnecting the input terminals and the second output terminals, receiving and automatically adjusting an attenuation therein of the received carrier, for any dBm power level thereof within the specified dBm power level range, for supply to the second output terminals as an output carrier of the specified dBm power level.

21. A transmission level setting circuit, as recited in claim 20, wherein the automatic gain control circuit comprises:

a voltage controlled amplifier circuit, functioning as a 0 dB amplifier, receiving the carrier from the input terminals and producing a carrier output having a fixed, dBm power level; and an element receiving and attenuating the output of the voltage controlled amplifier circuit by a fixed dB amount to produce the output carrier having a transmission level at the specified dBm power level, at the second output terminals.

22. A transmission level setting circuit, as recited in claim 20, wherein the voltage controlled amplifier circuit further comprises:

a first operational amplifier having a control input and producing the output carrier at an output thereof; and a feedback circuit producing an AC voltage average value of the output carrier of the first operational amplifier, as a feedback control signal supplied to the control signal input terminal of the operational amplifier.

* * * * *